United States Patent
Malig et al.

(10) Patent No.: US 7,413,696 B2
(45) Date of Patent: Aug. 19, 2008

(54) METHOD AND INJECTION MOLDING MACHINE FOR THE PRODUCTION OF ELASTOMER AND DUROMER MOLDED ITEMS

(75) Inventors: Christop Malig, Weinheim (DE); Udo Eping, Darmstadt (DE); Volker Schroiff, Hemsbach (DE); Heinz Gross, Neuenburg (DE); Peter Steinl, Landshut (DE)

(73) Assignee: Carl Freudenberg KG, Weinheim (DE)

( * ) Notice: Subject to any disclaimer, the term of this patent is extended or adjusted under 35 U.S.C. 154(b) by 308 days.

(21) Appl. No.: 10/494,854

(22) PCT Filed: Aug. 28, 2002

(86) PCT No.: PCT/EP02/09565

§ 371 (c)(1),
(2), (4) Date: Nov. 1, 2004

(87) PCT Pub. No.: WO03/039837

PCT Pub. Date: May 15, 2003

(65) Prior Publication Data

US 2005/0058742 A1   Mar. 17, 2005

(30) Foreign Application Priority Data

Nov. 7, 2001   (DE) .................. 101 54 676

(51) Int. Cl.
*B29C 45/54*   (2006.01)
*B29C 45/74*   (2006.01)

(52) U.S. Cl. .................. 264/328.4; 264/328.14; 425/543; 425/548; 425/558

(58) Field of Classification Search ............. 264/328.2, 264/328.14, 328.4; 425/550, 548, 549, 551, 425/543, 544, 557, 558, 561
See application file for complete search history.

(56) References Cited

U.S. PATENT DOCUMENTS

| | | | | |
|---|---|---|---|---|
| 1,986,544 A | * | 1/1935 | Theuer | 425/449 |
| 2,110,570 A | * | 3/1938 | Eichengrun | 425/378.1 |
| 3,284,421 A | * | 11/1966 | Breslow | 522/126 |
| 4,370,150 A | | 1/1983 | Fenstermaker | |
| 5,698,242 A | * | 12/1997 | Chen et al. | 425/544 |
| 6,045,740 A | * | 4/2000 | Gorlich | 264/297.2 |

FOREIGN PATENT DOCUMENTS

| | | |
|---|---|---|
| DE | 693 035 C | 7/1940 |
| DE | 33 20 520 C | 12/1984 |
| EP | 0 287 001 A | 10/1988 |
| EP | 0 391 323 A | 10/1990 |
| EP | 0 824 057 A | 2/1998 |
| EP | 0 860 263 A | 8/1998 |
| EP | 860263 * | 8/1998 |

(Continued)

*Primary Examiner*—Jill L Heitbrink
(74) *Attorney, Agent, or Firm*—Kenyon & Kenyon LLP

(57) ABSTRACT

A method for the production of elastomer and duromer molded items in an injection molding process using an injection molding machine with a respectively separately heatable filling unit, injection unit and cross-linking tool. The filling unit is heated to a temperature which is non-critical with regard to the cross-linking reaction of the plastic to be treated. The injection unit is heated to a temperature which is slightly below the cross-linking temperature of the molding material used.

8 Claims, 4 Drawing Sheets

FOREIGN PATENT DOCUMENTS

| | | | |
|---|---|---|---|
| FR | 723 465 A | 4/1932 |
| FR | 2 297 132 A | 8/1976 |
| FR | 2297132 * | 9/1976 |
| GB | 533 685 A | 2/1941 |
| GB | 1 019 557 A | 2/1966 |

* cited by examiner

METHOD AND INJECTION MOLDING MACHINE FOR THE PRODUCTION OF ELASTOMER AND DUROMER MOLDED ITEMS

FIELD OF THE INVENTION

The present invention relates to a method for producing elastomer and duromer molded parts. More particularly, the present invention relates to a method for producing elastomer and duromer molded parts using injection molding methods and injection molding machines each having a separately heatable filling unit, injection unit and cross-linking tool. The filling unit and the injection unit being heated to a temperature that is not critical for the cross-linking reaction of the plastic to be treated. At the same time, an injection molding machine for carrying out the method is described.

BACKGROUND INFORMATION

Injection molding methods and the injection molding machines required for them are widespread. In order to achieve good utilization of the machines, it is attempted to make vulcanization times as short as possible. The vulcanization time of component parts having a wall thickness of 1 cm is several minutes.

In order to decrease the vulcanization time, an injection molding machine has become known from U.S. Pat. No. 4,370,150, in which a periodically operating heating device is put in between the filling unit and the cross-linking tool, in which a part of the elastomer pressed in by the filling unit is heated to a temperature which just about corresponds to the cross-linking temperature in the cross-linking tool. The cross-linking process is repeated for each injection procedure. Here, a kind of pre-cross-linking of the elastomer takes place, so that the final cross-linking in the cross-linking tool is very much shortened in time. Such a device, however, has the disadvantage that, in the heating zone, cross-linking may occur, which impedes the injection procedure. In the usual injection molding machines for producing elastomer and duromer molded parts, the molding compound in the filling unit is plastified at a temperature that is non-critical to the cross-linking reaction, mostly between 70° and 90° C. Only after injection into the cross-linking tool, which is preheated to the cross-linking temperature, does the cross-linking reaction begin. Cross-linking reaches its maximum speed when the molding compound has reached the cross-linking temperature. Because of the low heat conductivity of the cross-linking molding compounds, the cycle time of the individual injection procedure is essentially determined by the cross-linking time. In this context, the heat transportation from the wall of the tool to the inner part of the molded part, so as to reach a maximum cross-linking speed, is the deciding factor.

SUMMARY OF THE INVENTION

The present invention is based on the object of further developing the injection molding method and the appertaining injection molding machine, in order to increase their productivity. The cross-linking time in the cross-linking tool of especially thick-walled molded parts is to be clearly reduced. In addition, the molded part should have a more uniform cross-linking structure.

According to an exemplary embodiment of the present invention, the injection unit itself is heated to a temperature that is slightly below the cross-linking temperature. In experiments it was shown that, by this measure, the vulcanization time was reduced quite considerably. The retention time of the elastomer in the injection unit is preferably reduced to a minimum. Additional parts on the injection molding machine, such as the special heating path named above, are not required.

The injection molding machine for carrying out the method is provided in a known manner with a filling unit, an injection unit and a cross-linking tool, which are separately heatable. In order to achieve a retention time of the molding compound that is as short as possible after leaving the filling unit, the injection unit is furnished with an annular cylinder having an annular piston. The heating of the annular cylinder and of the core of the cylinder may be done by appropriately designed heating elements. These heating elements may be regulated simultaneously and synchronously. The advantage of the preheating of the molding compound in the injection unit is that, directly after the complete filling of the cavity in the cross-linking tool, cross-linking begins at maximum speed. In spite of the poor heat conductivity properties of the molding compounds to be cross-linked, an essentially homogeneous temperature distribution is achieved over the entire cross section.

This, in turn, causes a largely uniform cross-linking structure over the entire component part thickness, since the cross-linking reactions sets in in all regions of the material that has been preheated close to the cross-linking temperature inside the cavity, approximately simultaneously at maximum speed. This enables one to achieve a high quality of the elastomer molded parts, at shortened cycle time, in the production of the parts. The cylinder chamber is preferably heated to at least 90% of the cross-linking temperature. Very favorable results are obtained if the heating is carried out up to 95 to 98% of the cross-linking temperature. As a rule, the volume of the molding compound contained in the cylinder chamber and heated close to cross-linking temperature is selected so that it corresponds to the volume of the tool cavity. A complete exchange of the molding compound in the cylinder chamber is thereby ensured. The piston ring space is able to be closed off on its underside by a slider. The volume for individual injection procedures may be varied by the appropriate development of the piston stroke.

DETAILED DESCRIPTION

Figure 1:
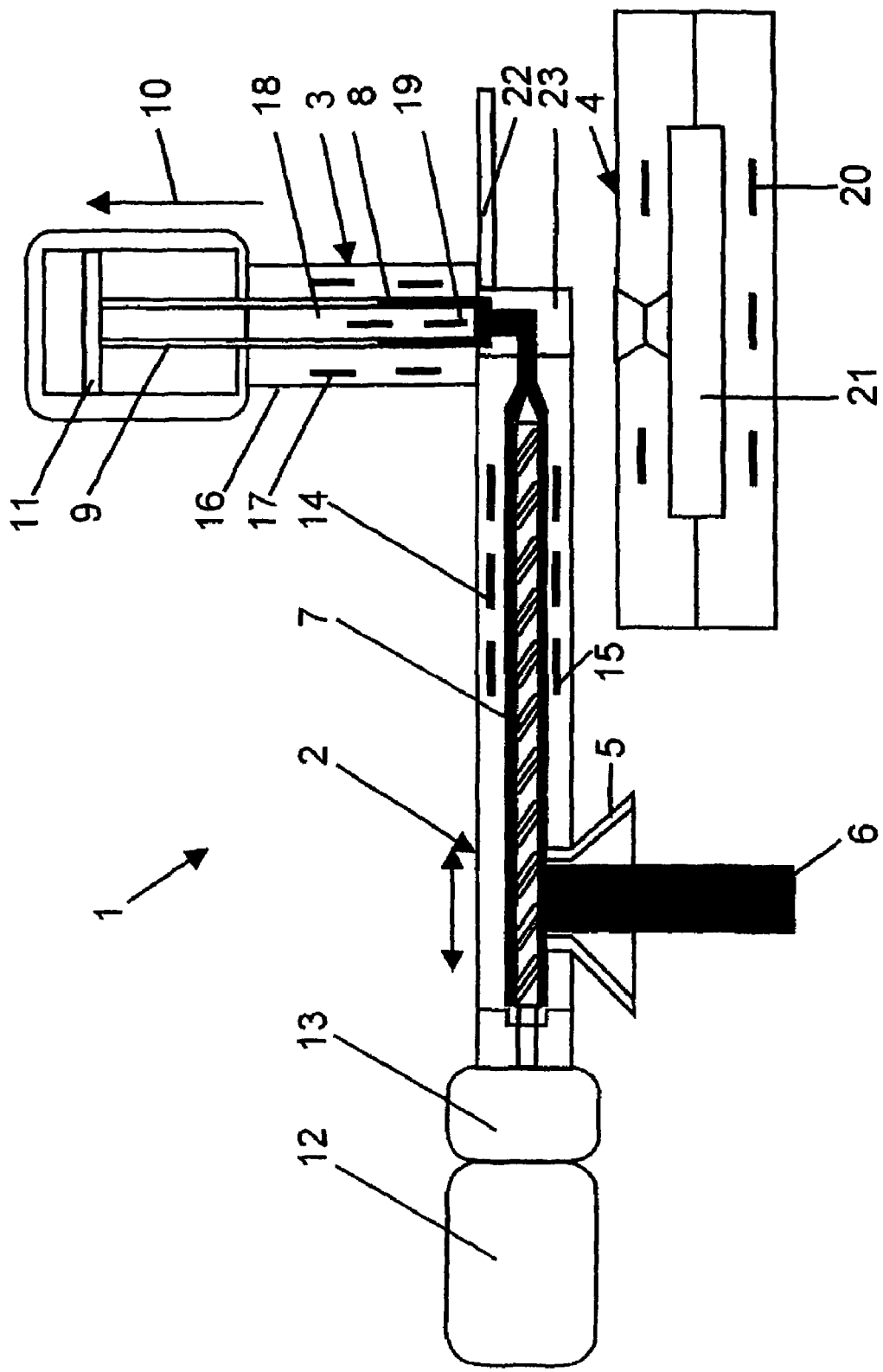
FIG. 1 is schematic illustration of an example embodiment of the injection molding machine of the present invention during filling.

In FIG. 1, an injection molding machine 1 is shown schematically, which is made up of filling unit 2, injection unit 3 and cross-linking tool 4. Injection molding machine 1 is shown during the filling procedure. Molding compound 6 introduced into feed region 5 is conveyed by wormgear 7 and the piston of filling unit 2 into ring space 8 of injection unit 3. Annular piston 9 moves upwards in this context, as shown by arrow 10. Pressure piston 11 is affixed at the upper end of annular piston 9, and it is needed for the injection procedure. Wormgear 7 is driven by motor 12, using a gear 13 placed in between. Wormgear housing 14 is furnished with separate heater to correct temperature 15. Ring cylinder 16 is equipped with heater to correct temperature 17. Preferably, cylinder core 18 is also furnished with heater to correct temperature 19. Cross-linking tool 4, which is located below injection unit 3, is provided with its own heater 20. The volumes of tool cavity 21 and of piston ring 8 are matched to each other in such a way that a filling of piston ring space 8 corresponds to a filling of tool cavity 21. A slider 22 at the underside of annular piston space 8 is used to close piston ring space 8 after filling.

The reference numerals in the following figures correspond to the parts described in FIG. 1.

Figure 2:
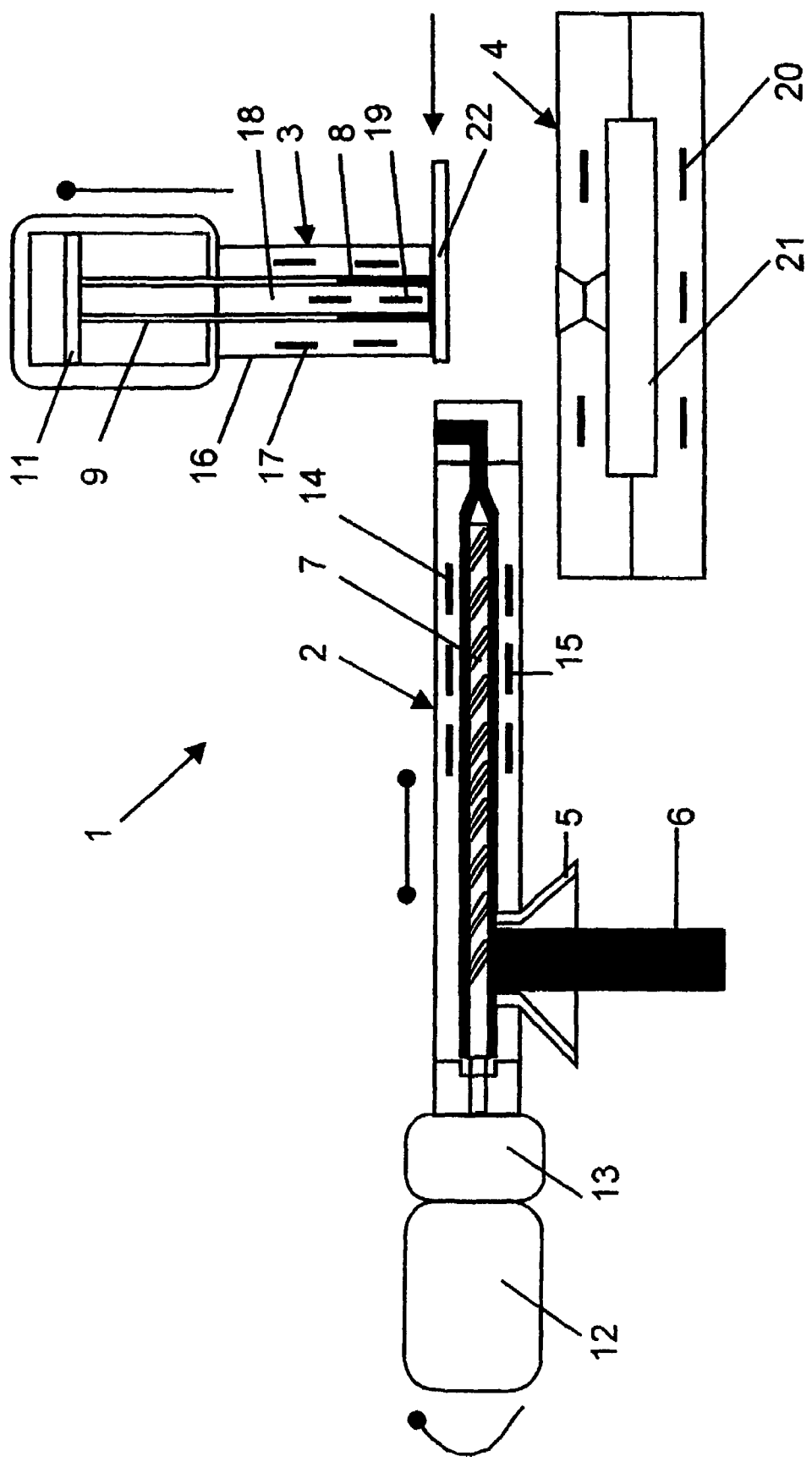
FIG. 2 is a schematic illustration of an example embodiment of the injection molding machine of the present invention after filling.

In FIG. 2 the filling of piston ring space 8 is closed off. Wormgear 7 is standing still. Slider 22 has closed off annular piston space 8. As in FIG. 1, the temperature at the filling unit is ca 80° C., the temperature at injection unit 3 is ca 165° C., and the temperature at cross-linking tool is ca 180° C.

Figure 3:
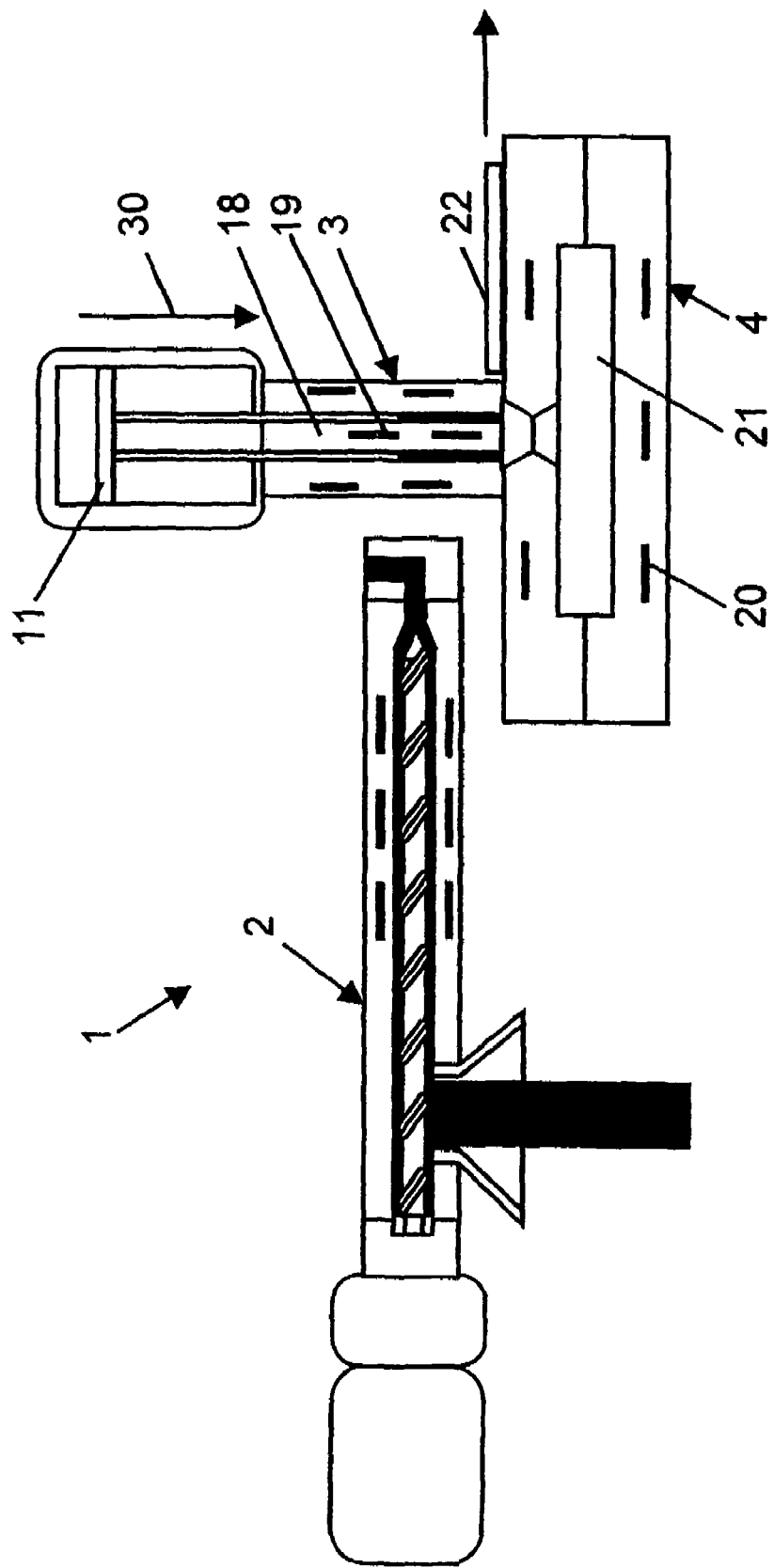
FIG. 3 is a schematic illustration of an example embodiment of the injection molding machine of the present invention prepared for the injection procedure.

In FIG. 3, injection unit 3 is connected to cross-linking unit 4, and the slider is open. Filling unit 2 is still in a position of rest. Injection unit 3 begins the injection procedure, which is indicated by arrow 30. The temperatures set in all three machine parts are maintained.

Figure 4:
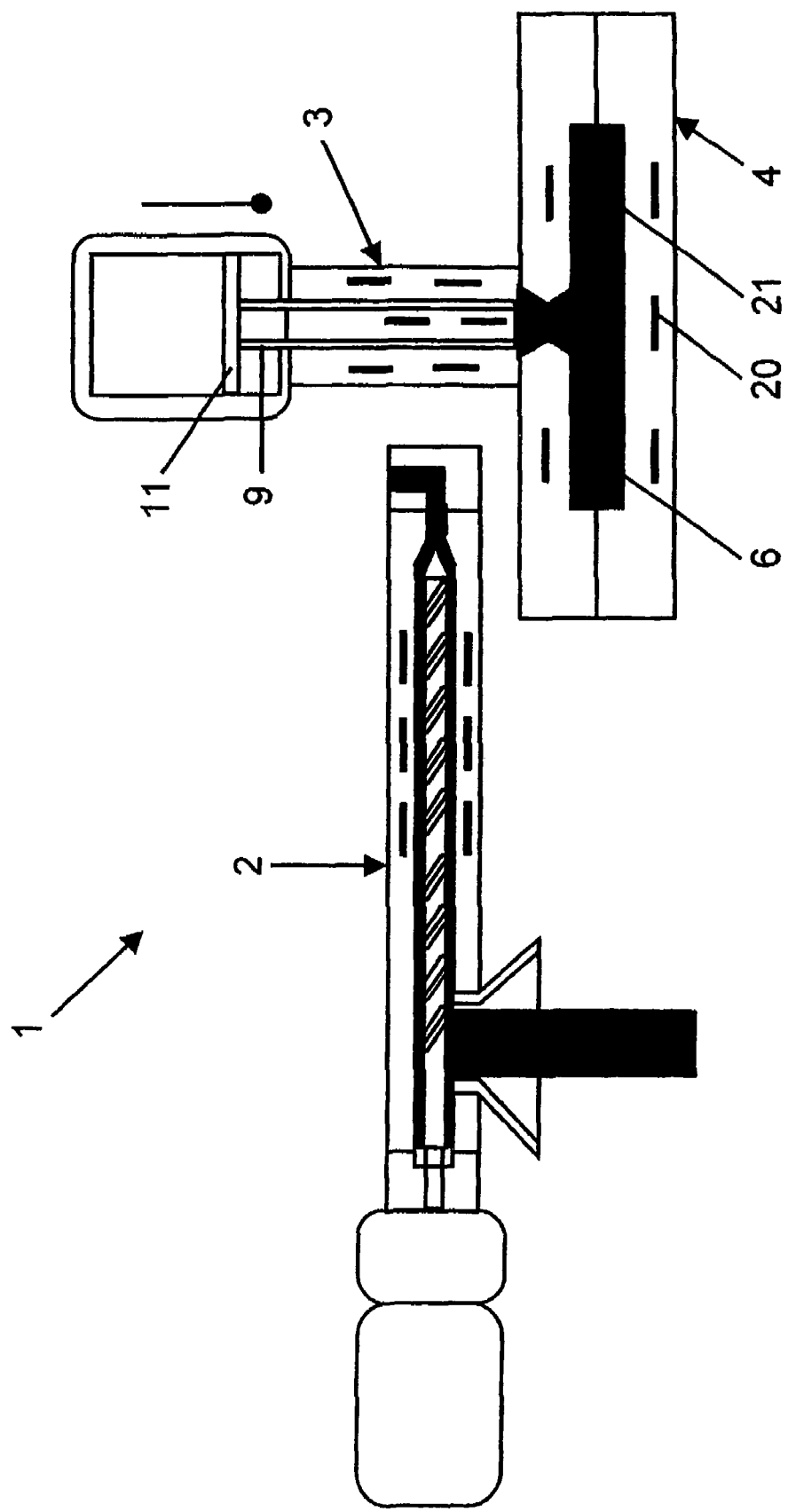
FIG. 4 is a schematic illustration of an example embodiment of the injection molding machine of the present invention after carrying out the injection procedure.

FIG. 4 shows the end of the injection procedure. Annular piston 9 has reached the stop at its lower end, and molding compound 6 has been squeezed out of piston ring space 8 into cavity 21 of cross-linking tool 4. This ends one cycle of the injection procedure, and the procedure is able to begin anew when the parts are assembled as in FIG. 1.

What is claimed is:

1. A method for producing elastomer molded parts and duromer molded parts using an injection molding machine comprising a separately heatable filling unit, injection unit and cross-linking tool, the injection unit having an annular cylinder, comprising the steps of:

introducing molding compound into the injection unit;

heating the filling unit to a temperature that is non-critical with regard to the cross-linking reaction of a plastic to be treated;

heating the core of the annular cylinder of the injection unit to a temperature that is slightly below the cross-linking temperature of the molding compound; and closing off the annular cylinder with a slider.

2. The method as recited in claim 1, wherein the injection unit is heated such that a retention time of the molding compound in the injection unit is minimized.

3. A method for producing elastomer molded parts and duromer molded parts using an injection molding machine comprising a separately heatable filling unit, injection unit and cross-linking tool, the injection unit having an annular cylinder, comprising the steps of:

introducing molding compound into the injection unit;

heating the filling unit to a temperature that is non-critical with regard to the cross-linking reaction of a plastic to be treated;

heating the annular cylinder of the injection unit to a temperature that is slightly below the cross-linking temperature of the molding compound; and closing off the annular cylinder with a slider.

4. An injection molding machine for cross-linking molding compounds comprising:

a filling unit;

an injection unit; and a cross-linking tool, wherein the filling unit, the injection unit and the cross-linking tool are each configured to be separately brought to predetermined temperatures, wherein the injection unit has an annular cylinder having an annular piston, and wherein the core of the annular cylinder is provided with a heating element, and wherein the annular cylinder is configured to be closed off on its underside by a slider.

5. The injection molding machine as recited in claim 4, wherein the injection unit is heated to a temperature that is slightly below the cross-linking temperature.

6. The injection molding machine as recited in claim 4, wherein the outer portion of the annular cylinder is provided with a heating element.

7. The injection molding machine as recited in claim 6, wherein the heating elements of the core and the outer portion of the annular cylinder are configured to be simultaneously and synchronously regulated.

8. The injection molding machine as recited in claim 4, wherein a volume of a cross-linking molding compound is contained in an annular space below the annular piston in the annular cylinder and is heated to nearly the cross-linking temperature, said volume corresponds to the volume of the tool cavity.

* * * * *